United States Patent [19]

Lechner et al.

[11] Patent Number: 4,905,227

[45] Date of Patent: Feb. 27, 1990

[54] CIRCUIT FOR SUBSCRIBER LINE INTERFACE CIRCUITS IN A DIGITAL TIME-DIVISION MULTIPLEX COMMUNICATION SWITCHING CENTER

[75] Inventors: Robert Lechner, Sankt Poelten, Austria; Norbert Wingerath, Munich, Fed. Rep. of Germany

[73] Assignee: Siemens Aktiengesellschaft, Berlin and Munich, Fed. Rep. of Germany

[21] Appl. No.: 163,484

[22] Filed: Mar. 3, 1988

[30] Foreign Application Priority Data

Mar. 9, 1987 [DE] Fed. Rep. of Germany ....... 3707500
Apr. 2, 1987 [DE] Fed. Rep. of Germany ....... 3711030

[51] Int. Cl.$^4$ ............................................. H04Q 11/04
[52] U.S. Cl. ...................................... 370/67; 370/85.9
[58] Field of Search .............................. 370/67, 85, 88; 340/825.5

[56] References Cited

U.S. PATENT DOCUMENTS 4,631,534 12/1986 Franklin et al. ....................... 370/85
4,654,890 3/1987 Hasegawa et al. .................... 370/85
4,740,955 4/1988 Litterer et al. ........................ 370/67

OTHER PUBLICATIONS

AMD Product Specifications; "AM 7901 Subscriber Line Audio-Processing Circuit"; Apr. 1983.

*Primary Examiner*—Joseph A. Orsino
*Assistant Examiner*—Frank M. Scutch, III
*Attorney, Agent, or Firm*—Jeffrey P. Morris

[57] ABSTRACT

A circuit for subscriber line interface circuits in a digital time-division multiplex communication switching center is disclosed. In the case of reception of the same information on the same time slot allocation via a number of subscriber line interface circuits, a transmit time slot as well as a receive time slot is alloted, but access of the transmit driver stages of the subscriber line interface circuits to the bus conductors leading to the switching center is prevented in order to avoid damaging interacting final stages in the transmit driver stages of the subscriber line interface circuits.

2 Claims, 2 Drawing Sheets

CIRCUIT FOR SUBSCRIBER LINE INTERFACE CIRCUITS IN A DIGITAL TIME-DIVISION MULTIPLEX COMMUNICATION SWITCHING CENTER

The invention relates to a circuit for subscriber line interface circuits in a digital time-division multiplex communication switching center over which a connection is established to four wire bus conductors of the time-multiplex communication switching center during respective allocated time slots.

In known arrangements of this type (see for example Product Specification AM 7901 of AMD-Advanced Micro Devices Co.) the allocation of a receive time slot and the connection of the receiver of the subscriber line interface circuit to the receiving branch of the bus conductor is always associated with the allocation of a transmit time slot and the connection of the transmitter of the subscriber line interface circuit to the transmit branch of the bus conductor.

In some cases, for example in emergency service or in the implementation of message services, it is necessary to transmit the same information to a plurality of subscriber line interface circuits, and their associated subscriber terminal equipment, during the same time slot. The simultaneous connection of the receivers of the plurality of subscriber line interface circuits would not thereby lead to difficulties. If, as is usually the case, a transmit time slot is also allocated, then the simultaneous connection of the transmit driver stages of the plurality of subscriber line interface circuits to the transmit branch of the bus conductor results. This causes the transmit driver stages to interact with each other with different transmit signal levels (which must always be assumed). Damage to these transmit driver stages will occur in these circumstances.

It is therefore desireable to have a circuit arrangement by means of which the simultaneous reception of the same information by a plurality of subscriber line interface circuits (Broadcasting), under the aforementioned assumptions, is made possible, while ruling out the possibility of damage to the transmit driver stages.

In accordance with principles of the present invention, a circuit for subscriber line interface circuits in a digital time-division multiplex communication switching center establishes a connection with a four wire bus conductor of the time-multiplex communication switching center during respective allocated time slots. The circuit provides access to receivers of related subscriber line interface circuits from the bus conductor for the simultaneous reception of the same information by a number of subscriber interface circuits, and their associated subscriber terminal devices respectively, during the same time slots, while at the same time preventing access of the transmit driver stages of these subscriber line interface circuits to the bus conductor.

In one embodiment of the circuit according to the invention, the subscriber line interface circuits include separate modules for the time slot allocation and for the connection to the bus conductor. The prevention of access of the transmit driver stage of the subscriber line interface circuit to the bus conductor in this embodiment results when the final stages of the transmit amplifiers of these components are placed in the high impedance state.

In another embodiment, separate switching components are coupled between the above modules and the bus conductor. The transmit driver stages are connected to the bus conductor through the switches, which are opened when it is desired to prevent access by the transmit driver stages.

A more detailed description of the invention follows below through reference to FIGS. 1 and 2 of an exemplary embodiment.

Figure 1:
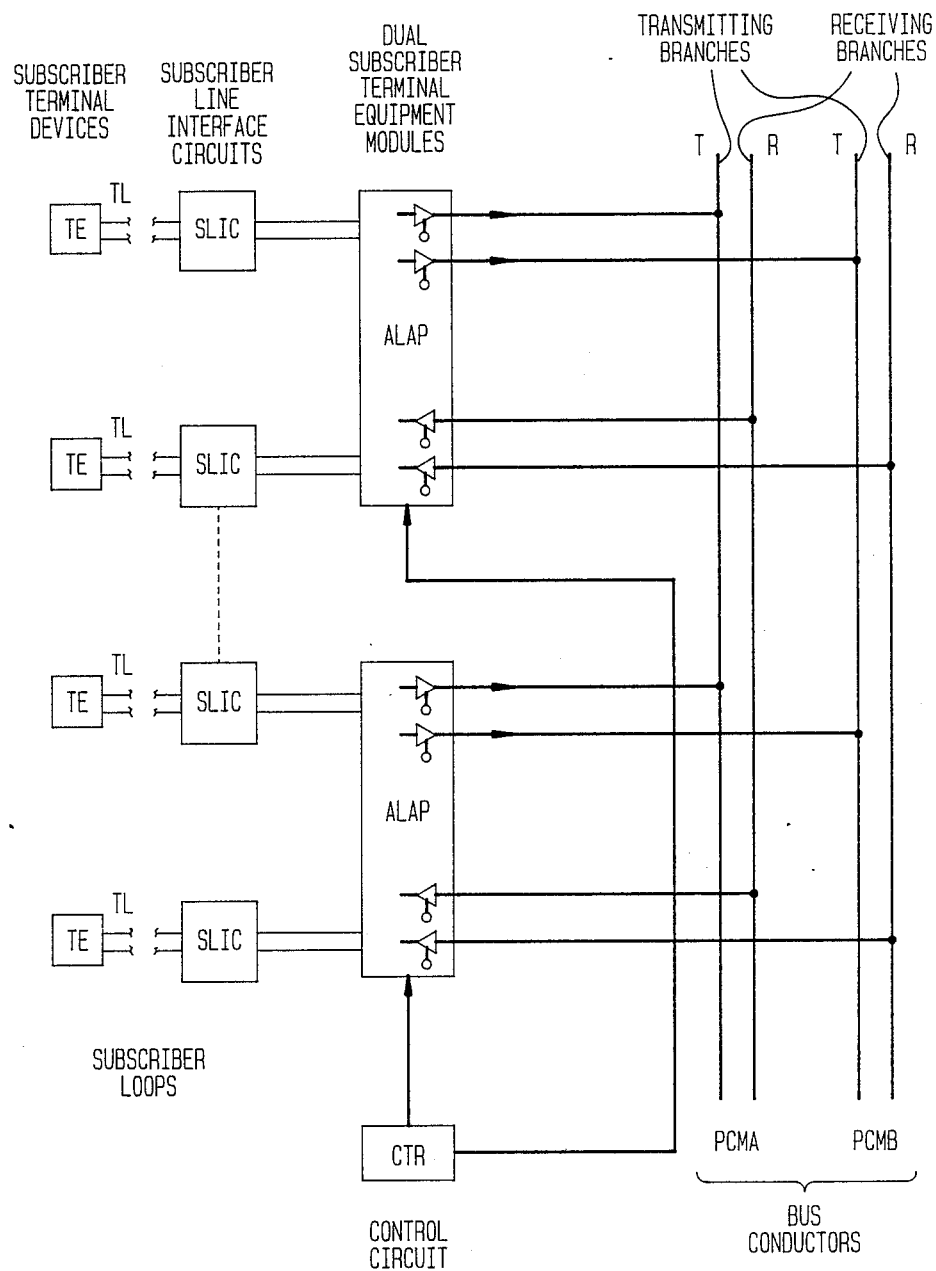
FIG. 1 shows the interconnection circuitry of a time-division multiplex switching center. Subscriber terminal equipment devices TE are connected to this switching center through the subscriber loops TL.

In FIG. 1, the subscriber line interconnection circuitry comprises individual subscriber line interface circuits SLIC as well as associated dual subscriber terminal equipment modules ALAP. Some of the so-called BORSCHT-functions, in particular, the function of the subscriber power supply (Battery), the (Overvoltage) protection, the (Ringing) power supply, the signaling and line status monitoring (Signals, Supervision) and the two wire-four wire transition (Hybrid), are provided by the SLIC module. The remainder of the BORSCHT-functions are provided by the ALAP modules, i.e. the analog-digital conversion (Coding) as well as the filter functions required in this connection.

In FIG. 1, the two bus conductors PCMA and PCMB, each with a transmitting branch T and a receiving branch R, respectively, are connected to the ALAP modules. These bus conductors provide a connection to the switching matrix of the switching facility (not shown) to which the illustrated interconnection circuitry, is related.

In addition, the ALAP contains devices for time slot allocation and for optional connection of the SLICs to the bus conductors PCMA and PCMB.

The SLIC and ALAP modules of the illustrated interconnection circuitry area are under the control of a group control (not shown) serving a number of subscriber line interconnection circuits.

When a plurality of subscriber interconnection circuits and/or subscriber terminal devices are to receive the same information (in the course of an announcement, for example) the same receiving time slot is allocated to the selected receivers of the subscriber line interconnection circuits via the respective ALAP module. With such an allocation of a receiving time slot, there is also an associated allocation of a transmit time slot. The danger of transmissions being made to the same time slot from a number of subscriber line interconnection circuits, with resulting damage to the final driver stages of the transmitters is then unavoidable, if the number of subscriber line interconnection circuits which are to receive information simultaneously, is greater than the number of time slots established on the bus conductors (32 or 64 depending on the design modification).

According to the invention, connection of the transmit driver stages of the selected subscriber line interconnection circuits to the bus conductor during such broadcasting is prevented. This can be brought about by placing the transmit driver stages of the ALAP modules, through which connection to the bus conductors is established, in the high impedance state. It is also possible, however, to provide a separate switching module, coupled between the ALAP modules and the bus conductors PCMA and PCMB, which opens the connection between these transmit driver stages and the bus conductors.

Figure 2:
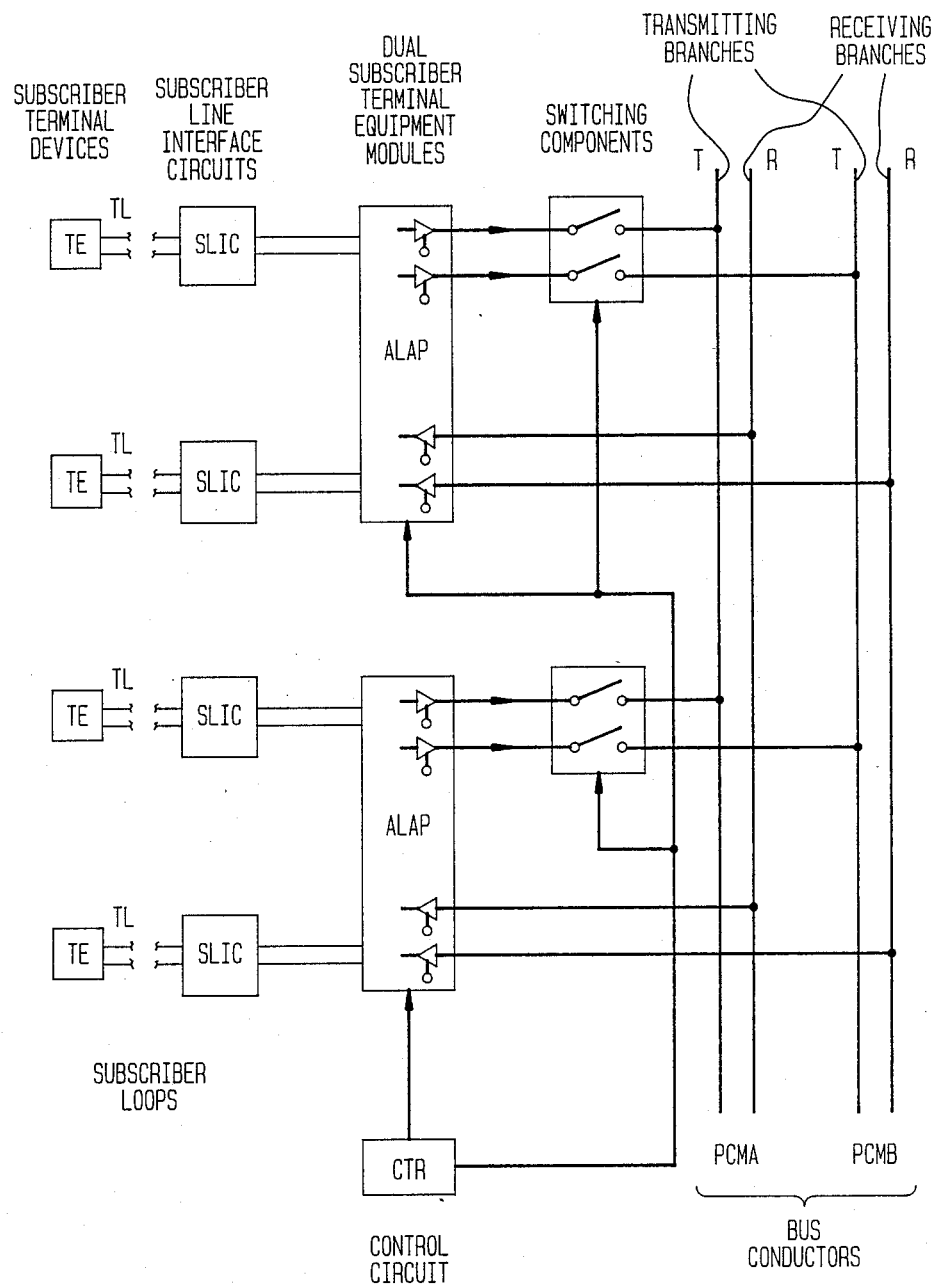
FIG. 2 shows another embodiment of the invention described with reference to FIG. 1 where separate switching components are included.

In accordance with another embodiment shown in FIG. 2 wherein like elements have like designations, separate switching components coupled between the modules and the bus conductor are illustrated wherein the switching components are opened selectively to prevent access by the transmit driver stages.

What is claimed is:

1. A circuit for subscriber line interface circuits in a digital time-division multiplex communication switching center over which a connection is established to a four-wire bus conductor of the time-division multiplex communication switching center during respective alloted time slots, comprising:

means connected to and providing access to the receiver of subscriber line interconnect circuits from said four-wire bus conductor, during the same time slot, for the simultaneous reception of the same information by a plurality of subscriber line interconnect circuits; and means for preventing access of the transmit driver stages of said subscriber line interconnect circuits to said bus conductor, whereby said subscriber line interface circuits each comprises a separate module for the time slot allocation and for the connection to the bus conductor including said transmit driver stages having transmit amplifiers which each include means for selectively placing said amplifiers in a high impedance state.

2. A circuit for subscriber line interface circuits in a digital time-division multiplex communication switching center over which a connection is established to a four-wire bus conductor of the time-division multiplex communication switching center during respective alloted time slots, comprising:

means connected to and providing access to the receiver of the appertaining subscriber line interconnect circuits from said four-wire bus conductor, during the same time slot, for a the simultaneous reception of the same information by a plurality of subscriber line interconnect circuits; and means for preventing access of the transmit driver stages of said subscriber line interconnect circuits to said bus conductor, whereby said subscriber line interface circuits each comprise a separate module for said time slot allocation and for the connection to the four-wire bus conductor; and further including:

a plurality of switching units, each of said switching units being coupled between said modules and said four-wire bus conductor, the switch connections of which establish connections to the transmit driver stages and which switch connections are respectively opened in the event of simultaneous reception of the same information by said subscriber interface circuits.

* * * * *